C. F. M. VAN BERKEL.
STACKER FOR SLICING MACHINES.
APPLICATION FILED JULY 5, 1917.
1,290,425.
Patented Jan. 7, 1919.
5 SHEETS—SHEET 3.
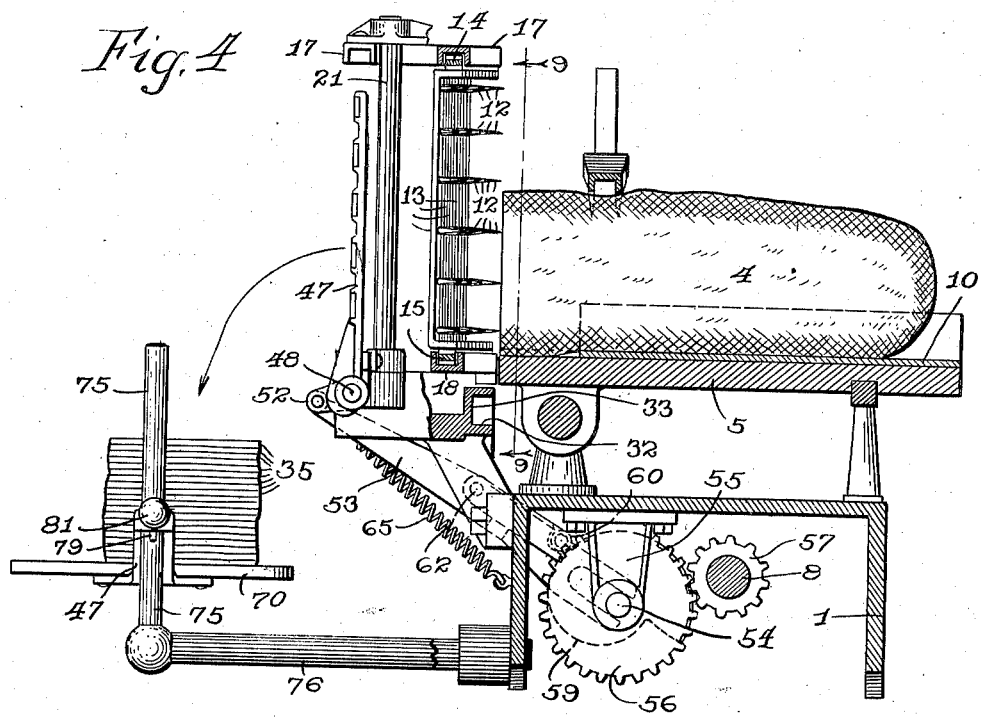
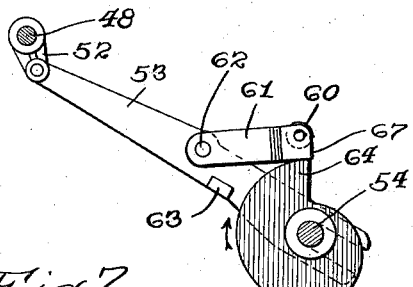
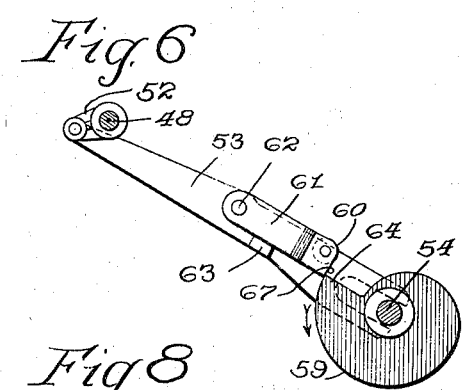
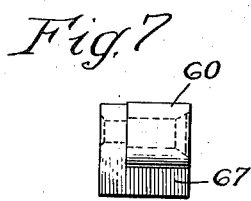
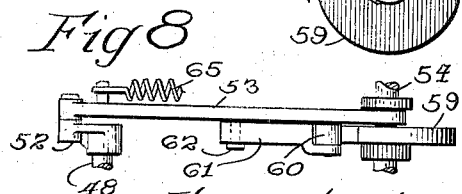
Inventor:
Cornelis F.M. van Berkel C. F. M. VAN BERKEL.
STACKER FOR SLICING MACHINES.
APPLICATION FILED JULY 5, 1917.

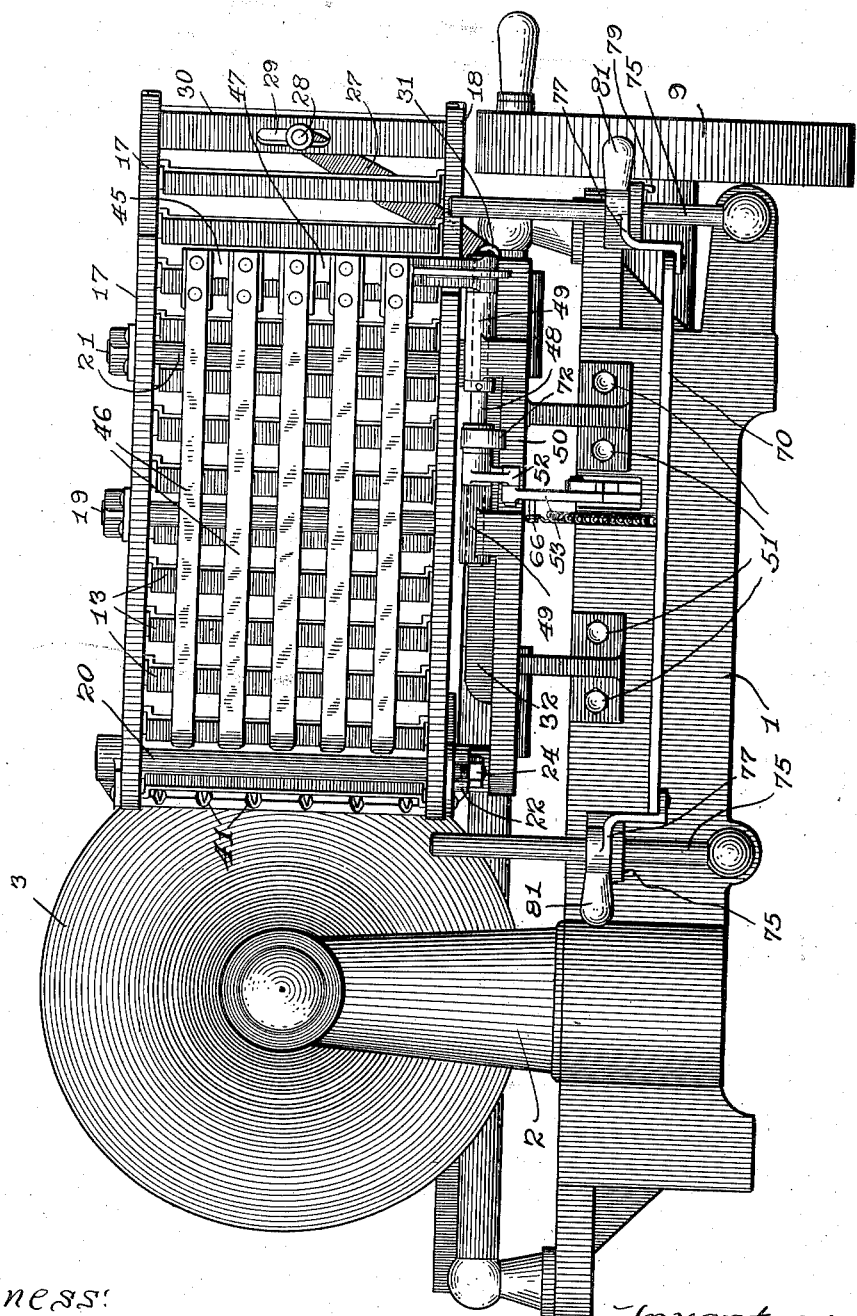

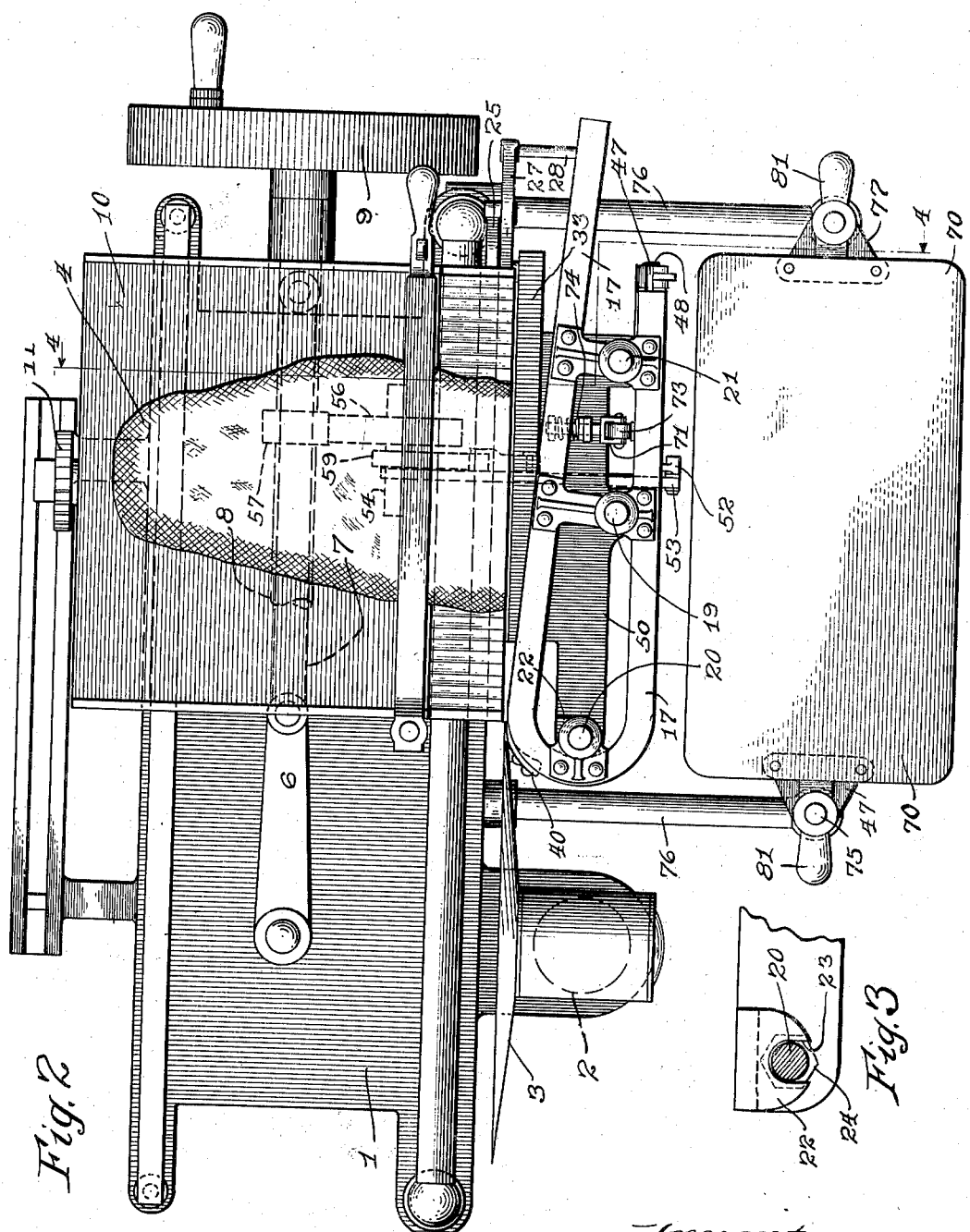

1,290,425.

Patented Jan. 7, 1919.
5 SHEETS—SHEET 4.

Witness:
L. B. Graham.

Inventor:
Cornelis F. M. van Berkel
By Brown Nissen Sprinkle
Att'ys.

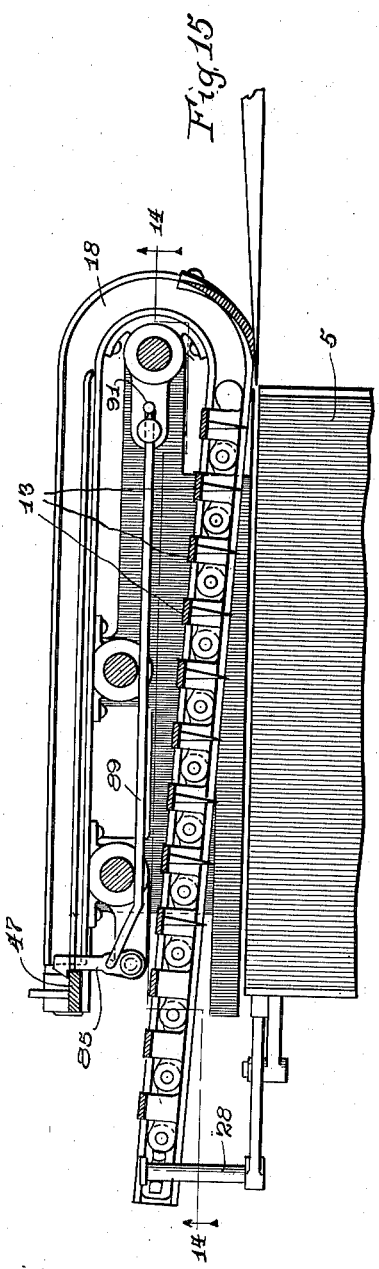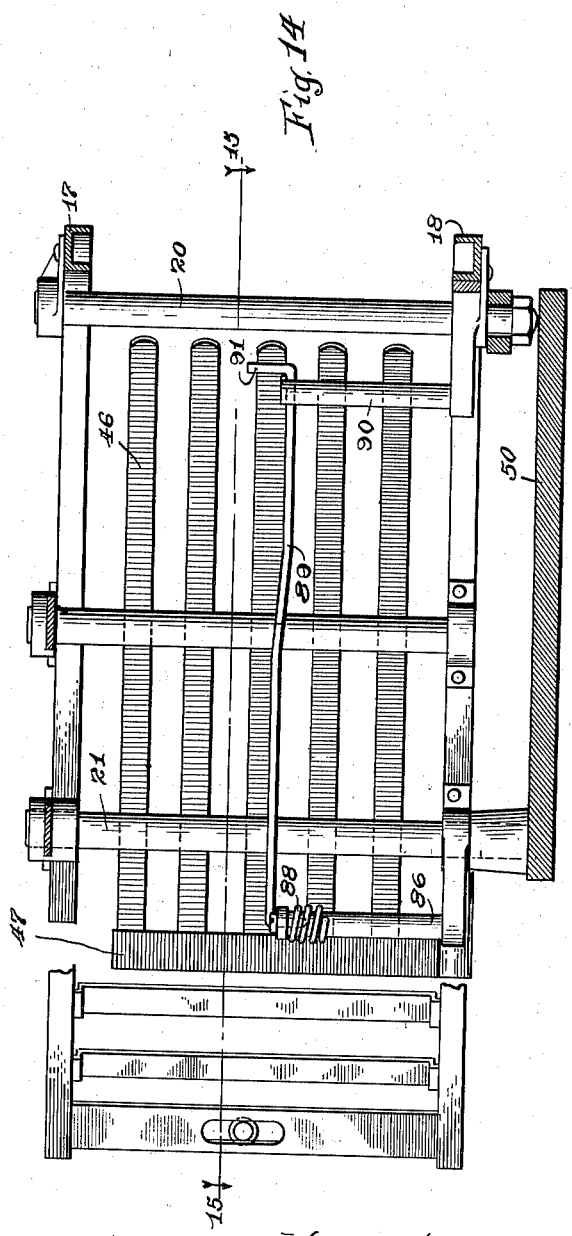

UNITED STATES PATENT OFFICE.

CORNELIS F. M. van BERKEL, OF LAPORTE, INDIANA, ASSIGNOR TO U. S. SLICING MACHINE COMPANY, OF LAPORTE, INDIANA, A CORPORATION OF INDIANA.

STACKER FOR SLICING-MACHINES.

1,290,425.

Specification of Letters Patent.     Patented Jan. 7, 1919.

Application filed July 5, 1917. Serial No. 178,734.

*To all whom it may concern:*

Be it known that I, CORNELIS F. M. VAN BERKEL, a subject of the Queen of the Netherlands, residing at Laporte, in the county of Laporte and State of Indiana, have invented certain new and useful Improvements in Stackers for Slicing-Machines, of which the following is a specification.

This invention relates to mechanism for stacking the slices of meat or other material, as they are cut by a slicing machine, and has for its object the provision of a device of the character named which shall be of improved construction and more efficient in its operation than similar devices previously known.

The invention is exemplified in the combination and arrangement of parts shown in the accompanying drawings and described in the following specification, and it is more particularly pointed out in the appended claims.

Figure 9:
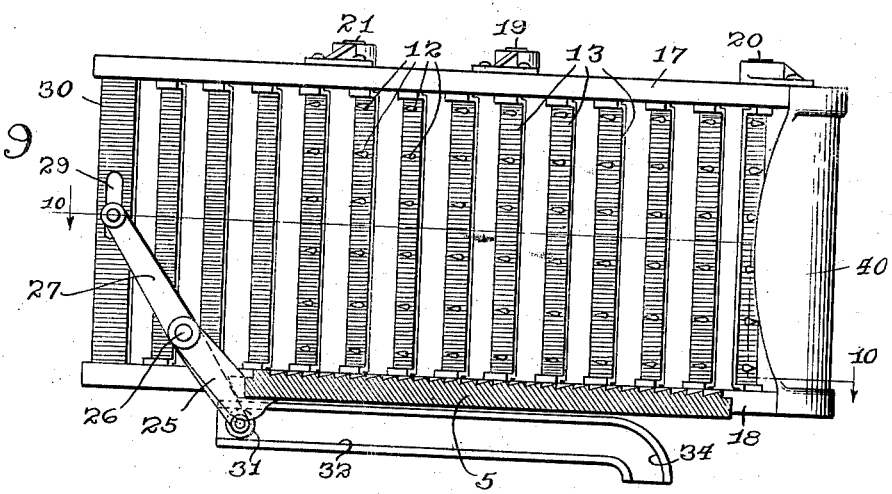
Figure 10:
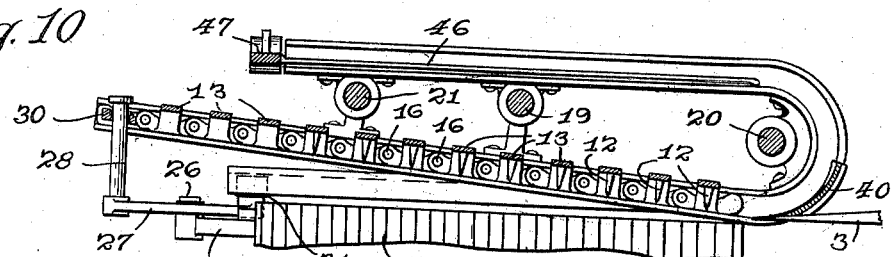
Figure 11:
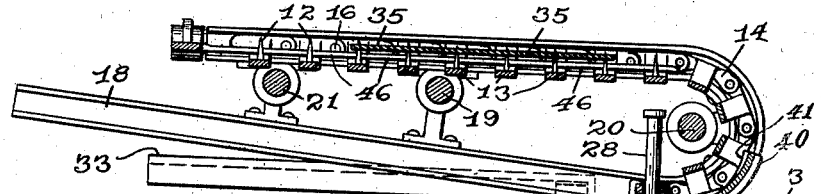
Figure 13:
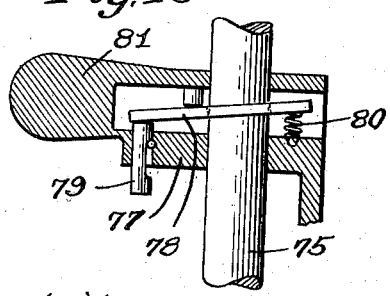
Figure 12:
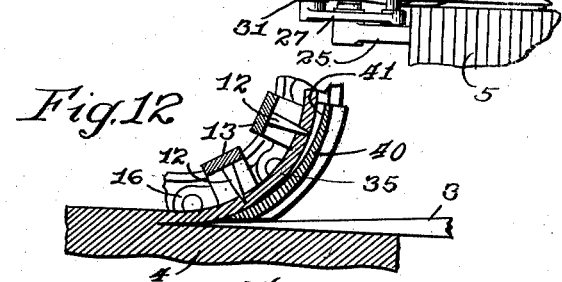

In the drawings, Figure 1 is a front elevation of a slicing machine having one embodiment of the present invention connected therewith; Fig. 2 is a top plan view of the machine shown in Fig. 1; Fig. 3 is a fragmentary detail; Fig. 4 is a vertical sectional view substantially on line 4—4 of Fig. 2; Figs. 5, 6, 7, and 8 are detail views of the operating cam and associated parts of the stacker fly; Fig. 9 is a sectional elevation on line 9—9 of Fig. 4; Fig. 10 is a horizontal sectional view on line 10—10 of Fig. 9; Fig. 11 is a view similar to Fig. 10 but with the stacker belt in discharging position; Fig. 12 shows a portion of the stacker belt and its relation to the slicing knife on a larger scale than that of Figs. 10 and 11; Fig. 13 is a detail of the support for the stack of slices; Fig. 14 is a fragmentary vertical section of the stacker frame of a slightly modified form of the invention; and Fig. 15 is a horizontal section on line 15—15 of Fig. 14.

In the operation of machines for slicing most materials, it is desirable to place the slices, as they are formed, in a pile or stack on top of one another. It has been customary for the operator to grasp the slice as it is formed, in one hand, while he turns the machine with the other, and places the slices in stack formation. This, of course, is an inconvenient method of operation, and in many cases is unsanitary where the operator is not sufficiently careful with regard to the cleanliness of his hands. Moreover, during the slicing of meat and similar substances, this old mode of operation renders the hands greasy so that they must be washed with soap before the operator may perform other tasks. It is, therefore, very desirable to provide a machine which shall perform the stacking operation mechanically.

In the drawings, the numeral 1 designates the base of a slicing machine which may be of well known and approved construction and which is provided with a standard 2 carrying the usual form of disk knife 3 for cutting slices from a piece of material 4 carried on a reciprocating table 5. The table 5 is moved toward and away from the knife 3 to feed the material to the knife by a crank 6 and pitman 7. The crank 6 is connected by means of the bevel gearing with the main drive shaft 8 which is rotated by means of the hand wheel 9, or which may be rotated by a motor in the case of a power machine. The material 4 is fed across the table 5 by means of a plate 10 and ratchet mechanism 11, in a manner well known in the art.

As the slices are cut from the front portion of the material 4 they are received on prongs or spikes 12 which are carried by upright bars 13 secured at their upper and lower ends to the links of chains 14 and 15, respectively.

The bars 13 have their upper and lower ends respectively, formed integral with the links of the chains 14 and 15, and are offset relative to the plane of the pivotal connections 16 of the links, as shown in Figs. 4 and 10. The prongs 12 of the bars 13 project from the bars toward the plane of the pivotal connections 16 of the chain links, and the prongs are of sufficient length to bring the points slightly past the plane of these pivotal connections, so that when a slice of meat has been forced onto the prongs, the slice will lie substantially in the plane of the pivots. In this way the slice-engaging portions of the prongs are always maintained at a uniform distance from one another, whether the chains 14 and 15 are straight or curved around a bend in their guides. The conveyer chains 14 and 15 are provided respectively, with guide channels 17 and 18 which are held in rigid spaced relation relative to one another by a pair of upright posts 19 and 20. The chain guides 17 and 18 and their connecting posts 19 and 20, together with necessary bracing members, constitute a unitary stacker frame which is pivotally supported on a third post 21 so that it may swing slightly about the post 21 to move the end of the frame, adjacent the knife, a sufficient distance away from the knife to permit cleaning of the parts of the machine. A supporting bracket 22 (Figs. 1 and 3) is provided for the end of the frame adjacent the knife, and the lower end of the post 20 is permitted to extend through an opening 23 in the bracket 22, and a nut 24 is carried by the lower end of the post 20 by means of which the stacker frame may be securely locked in operating position.

The slice carrier, comprising the chains 14 and 15, the upright bars 13 and prongs 12, is caused to travel in its guides 17 and 18 by a connection between the carrier and the reciprocating table 5, which connection is best shown in Figs. 9, 10 and 11. A bracket 25 is rigidly secured to the table 5 and carries a pivot 26 on which a lever 27 is mounted. A pin 28 is carried by the upper end of the lever 27 and passes through a slot 29 in a bar 30, which is substituted for the upright bar 13 in the end links of the conveyer chains 14 and 15. The lower end of the lever 27 is provided with a roller 31, which travels in a groove 32 in a channel bar 33, rigidly secured to the frame of the machine, as shown in Fig. 1. The channel bar 33 and the groove 32 are given a downward turn, as shown at 34 in Fig. 9 of the drawings, at the end of the bar adjacent the slicing knife. As the table 5 moves to the right in Fig. 9, toward the slicing knife, the lever 27 and the upright bar 30 will be caused to move in unison with the table, since the lever 27 is prevented from rotation about the pivot 26 by the roller 31 which travels in the groove 32. As the table 5 nears the end of its travel, the roller 31 will be prevented from further forward movement by the turn 34 in the groove 32. This will cause the upper end of the lever 27 to travel at a greater rate of speed than the table 5, and thus increase the amount of travel of the slice carrier at the end of the reciprocation of the table. This increase in the travel of the slice carrier occurs after the table has passed the knife and after the slice has been completely severed, and is for the purpose of moving the carrier a sufficient amount to bring the last portion of the slice around the bend at the end of the frame, and into the position on the front side of the carrier, from which it is discharged onto the stack. This will be best understood from Fig. 11 which shows a slice 35 in position to be discharged from the carrier. It will be readily understood that the movement of the bar 30, toward the slicing knife, will push the entire slice carrier before it, since the links of the chain are held from buckling relative to one another by their guide channels 17 and 18. A number of idle links are provided immediately adjacent the bar 30, in order that the bars which carry the slices may be forced entirely around the curve at the end of the guide channels adjacent the knife, as shown in Fig. 11. The slice engaging prongs may be omitted from these idle bars, as indicated in the figures of the drawings.

The portions of the guide channels 17 and 18 on the side of the stacker frame, adjacent the slicing machine, may be positioned at a slight angle to the plane of the slices being formed, so that the teeth of the slice carrier are gradually fed into the material as the table 5 and the slice carrying conveyer are moved in unison toward the slicing knife. It should be understood, however, that this feature is not absolutely essential since the slice carrier may be arranged in a plane parallel with the face of the material being sliced and the material will then be simultaneously forced onto all of the prongs by the feeding movement of the table. Where the angular arrangement shown in the drawings is employed, the pin 28 must be made of sufficient length to reach the slot in the bar 30, when the bar is at the end of the guide channel, as shown in Fig. 10.

The guide channels for the slice carrier are so positioned, relative to the slicing knife and the forward edge of the table 5, that the prongs 12 are fed into the material an amount approximately equal to the thickness of the slice prior to disconnection of the slice from the main body of the material, and just sufficient clearance is provided to prevent contact between the points of the prongs and the edge of the knife as the prongs pass the knife. A guard plate 40 is located adjacent the path of movement of the slice as it is carried around the bend at the end of the stacker frame, adjacent the knife. This guard plate, as shown in Fig. 12, deflects the slice away from the knife edge and prevents it from falling away from the points of the prongs 12 at the position where it is thus deflected. The edge of the guard plate farthest from the knife is given a slightly greater curvature than that of the guides for the slice carrier, and a series of grooves 41 are provided in this edge of the guard through which the points of the prongs 12 pass as they travel around the curved end of the guides. By this arrangement, the slice is forced onto the prongs a sufficient amount to permit the points of the prongs to protrude slightly from the outer surface of the slice. This insures the slice against any danger of falling from the prongs while it is being carried to the discharge position.

For discharging the slices from the carrier, a fly 45 is provided which carries a series of arms 46 arranged to pass between the rows of prongs 12 between the uprights 13 and the slice 25 as the slice is carried to the outer side of the stacker, as shown in Fig. 11. The arms 46 are carried by an upright 47 rigidly secured to a shaft 48 journaled in bearings 49 carried on a bracket 50 secured to the frame of the machine by leg screws 51. The shaft 48 also carries a rocker arm 52 to which is pivotally attached one end of an operating bar 53. The opposite end of the bar 53 is bifurcated, as shown in Figs. 4, 5 and 6, and extends over a shaft 54 journaled in brackets 55 secured to the under surface of the machine frame. A gear 56 is attached to the shaft 54 and meshes with a pinion 57 carried on the main drive shaft 8. A cam 59 is secured to the shaft 54 having its periphery arranged to engage with a roller 60 carried by a link 61 pivoted at 62 to the bar 53. The link 61 is free to swing about its pivot in one direction, as shown in Fig. 5, but is prevented from movement in the opposite direction by a stop 63 secured to the bar 53. The periphery of the cam 59 normally bears against the roller 60 and the cam is so shaped that when the shaft 54 rotates in the direction of the arrow in Fig. 6, the bar 53 will be forced outwardly during a one-half turn of the shaft and will be held stationary in its outermost position during the second half of the rotation of the shaft. After the shaft has made a complete rotation, the edge of the link 61 will pass over the shoulder 64 on the cam 59 and the bar 53 will be drawn backwardly toward the shaft 54 by a coil spring 65 secured to the bar 53 by means of a pin 66, as shown in Figs. 1 and 4. The operating surface of the cam 59 normally operates against the roller 60 but leaves the roller just before the backward movement of the bar 53 is permitted. The link 61 is provided with an additional bearing surface 67 which extends parallel with the axis of the roller 60, as shown in Fig. 7. The purpose of the additional bearing surface 67 is to release the bar 53 more nearly instantaneously than would be done if a roller alone were used. The bearing surface 67 may be set slightly farther from the cam surface than the periphery of the roller 60, to insure bearing of the cam surface on the roller during the principal portion of the rotation of the cam. In practice, however, it is customary to arrange the surface flush with the roller and permit the more rapid wearing of the fixed surface to provide the necessary relief. The link which carries the roller 60 is pivotally connected to the bar 53 for the purpose of permitting reverse rotation of the shaft 54. When this shaft is rotated in the direction of the arrow in Fig. 5, the shoulder 64 of the cam will strike the bearing surface 67 but this will not prevent rotation of the shaft since the link 61 is free to swing out of the way of the cam, as illustrated in this figure.

When the bar 53 is released by the cam 59 and permitted to move toward the shaft 54 under the tension of the spring 65, the fly 45 will be rotated outwardly and downwardly about the shaft 48 and will disengage the slice 35 from the prongs 12 and carry the slice before it into a horizontal position above a receiving table 70. The slice will then fall from the fly onto the upper surface of the table. It should be noted that the fly is operated in the discharging direction by the spring and is returned to its initial position by the cam. This secures uniform speed of operation of the fly during the discharge of the slice independently of the speed of operation of the slicing machine. This arrangement is very important since the range of speed for the best operation of the fly is not very great. Too great a speed will tend to throw the slice away from the machine and so prevent proper stacking, while too slow a speed will permit the slice to drop downwardly in a crumpled condition instead of being carried before the fingers 46 into a horizontal position from which it is dropped upon the stack. Since the spring operates with the same speed, regardless of the speed at which the hand wheel 9 is rotated, the slices are always dropped from the fly under exactly the same conditions, and will therefore fall evenly on top of one another and form a uniform pile.

To insure a smoother movement of the fly and to prevent shocks at the limit of its movement, a spring brake or rather a shock absorber 71 (Figs. 1 and 2) is caused to coöperate with a cam 72 carried by the shaft 48. This shock absorber comprises a roller 73 which is constantly pressed outwardly by a coil spring 74 into contact with the periphery of the cam 72. The arrangement is such, that the pressure is very light upon the cam when the fly is in its uppermost position but gradually increases until it becomes sufficient to overcome the decreased tension of the spring when the fly has reached a horizontal or discharging position. In this way the fly is limited in its downward movement and stopped without shock or noise under exactly the same conditions at each operation. It has been found in practice, that as a result of the operation of these parts, the slices may be dropped a considerable distance onto the table 70 and yet will arrange themselves in a uniform stack. This makes it unnecessary to provide a table arranged to move downwardly after each slice is deposited, since the table can be set a sufficient distance below the lower limit of the movement of the fly to permit the formation of a stack of any height ordinarily desired, without additional adjustment of the position of the table.

The table 70 may be adjustably held in position to receive the slices by means of uprights 75 carried at the ends of horizontal bars 76, projecting forwardly from the frame of the machine. Brackets 77 (see Fig. 13) are attached to each end of the table and are provided with clutch collars 78 which hold the table against downward movement, but permit ready adjustment into any desired position when pins 79 are pressed upwardly by the operator to release the grip of the collars on the bars 75. Coil springs 80 normally hold the clutch collars in gripping position. Handles 81 are secured to the brackets 77 to facilitate adjustment of the table.

The operation of the machine may be summarized as follows: The material to be sliced is clamped upon the plate 10 in the usual manner and the hand wheel rotated to perform a slicing operation. This is all the manipulation required of the operator. As the table 5 is reciprocated back and forth, the prongs 12 on the slice carrier will move in unison therewith for all positions except at the extreme end of the movement of the table toward the slicing knife after the material being sliced is no longer adjacent the prongs. It will thus be seen that the prongs will not interfere with the feeding of the material transversely to the plane of the knife since they always occupy a fixed position relative to the material and reciprocate with it during the time that the material is fed across the table 5. As a particular slice is severed by the slicing knife, it will be carried by the prongs 12 around the curved end of the stacker frame, and will be forced more securely onto the prongs 12 by the guard plate or deflector 40. There will be no distortion of the slice during this operation since the slice engaging portions of the prongs are maintained at a uniform distance from one another, because of their position in the surface of curvature of the conveyer belt. When the slice has been entirely severed, an additional throw is imparted to the carrier by means of the lever 27 and its guide channel 32 and the slice is thus brought into discharge position, as shown in Fig. 11. During the movement of the slice into this position, the fingers 46 of the fly 45 enter the space between the rear of the slice and the bars 13 and just at the time when the table 5 is passing dead center preparatory to its return movement, at which time the slice carrier will also be at rest, the cam 59 releases the spring 65 and the fly is rotated forwardly and downwardly to disengage the slice from the prongs and to discharge it onto the stack. During the return movement of the table 5 and the slice carrier, the fly is forced upwardly by the first half of the cam 59 so that it is in position to enter between the prongs of the carrier behind the next slice during the next forward movement of the table. The fly is held in this position during the formation of the slice by the second half of the cam 59 which is spaced a uniform distance from the center of the shaft 54. The operation is repeated by a simple continuous rotation of the fly wheel handle until as many slices are deposited upon the table as is desired.

In the modification shown in Figs. 14 and 15, a catch 85 is pivotally mounted on a post 86 and engages the arm 47 of the fly 45 to positively retain the fly in upright position independently of the cam 59. A spring 88 holds the catch in engagement with the arm 47. A control rod 89 is connected with the catch 85 and is slidably supported at its opposite end on a second post 90. The end of the rod is bent upwardly, as shown at 91, and extends into the path of the pin 28 by which the slice conveyer is driven. The arrangement is such, that the pin 28 engages the bent end 91 of the rod 89 just as the pin reaches the end of its stroke and after the bar 53 has been freed from the shoulder 64 of the cam 59, and by drawing the bar to the right, as viewed in the drawing, releases the catch 85 from the fly. This insures a practically instantaneous release of the fly so that the motion of the fly will keep it in engagement with the slice, with sufficient force, to prevent falling of the slice during initial movement of the fly. Where a quick release catch for the fly is employed, a simple roller coöperating with the cam 59 is sufficient without the supplemental bearing shoulder 67.

I claim:

1. The combination with a slicing machine, of a slice stacker therefor, and mechanism for operating the slice discharging portion of said stacker at a speed independent of the speed of said machine to discharge slices therefrom.

2. The combination with a slicing machine, of a slice stacker therefor comprising a device for positioning the slices upon a stack, and means for moving said device during the positioning operations thereof at a speed independent of the speed of said slicing machine.

3. The combination with a slicing machine, of means for receiving slices formed by said machine, a device for discharging the slices from said receiving means, and mechanism for operating said discharging device at a uniform speed for the different operations thereof independent of the speed of said slicing machine.

4. The combination with a slicing machine, of means for receiving slices as they are formed by said machine and for transferring said slices away from the slicing knife, a device for discharging said slices from said receiving means, and means for operating said discharging device at a speed independent of the speed of said slicing machine.

5. The combination with a slicing machine, of a device for positioning the slices formed by said machine, means for transferring slices formed by said machine to said positioning device, and resilient means for actuating said device during slice-positioning movement thereof.

6. The combination with a slicing machine, of means for receiving the slices formed thereby, a spring actuated slice positioning device for depositing slices upon said slice-receiving means, and mechanism for transferring slices formed by said machine to said positioning device.

7. The combination with a slicing machine, of means for receiving the slices formed thereby and for transferring said slices away from the slicing knife, and a slice positioning device, spring actuated for transferring the slices from said receiving device to a stack.

8. The combination with a slicing machine, of a conveyer for receiving slices formed by said machine and for transferring said slices away from the knife, a fly for discharging the slices from said conveyer, and actuating mechanism for said fly arranged to operate said fly at a uniform speed for different discharging positions independently of the speed of said machine.

9. The combination with a slicing machine, of mechanism for receiving slices therefrom and discharging said slices downwardly in flatwise position, and means for operating said mechanism to cause discharge of said slices under uniform conditions for different operations of said machine independently of the speed of said machine.

10. The combination with a slicing machine, of a spring actuated slice discharging device therefor, means for transferring slices formed by said machine to said discharging device, and a buffer for controlling the movement of said device.

11. The combination with a slicing machine, of slice stacking mechanism therefor, a spring actuated fly for discharging slices from said mechanism, and a buffer for arresting the movement of said fly.

12. The combination with a slicing machine, of a conveyer having prongs for receiving slices formed by said machine, a fly for discharging slices from said prongs and for moving said slices into a horizontal position, a spring for actuating said fly, and a buffer for arresting the movement of said fly to permit discharge of the slices therefrom when said fly has reached an approximately horizontal position.

13. The combination with a slicing machine, of a conveyer having prongs thereon for receiving slices from said machine and for holding said slices in an upright position, a fly for discharging slices from said prongs arranged to move about a horizontal pivot to transfer said slices from an upright position to a horizontal position, a spring for actuating said fly during such transferring operation, and a spring buffer for arresting the movement of said fly when said slice has reached a horizontal position to cause the discharge of said slice from said fly.

14. The combination with a slicing machine, of a pivot fly for discharging slices therefrom, means for transferring slices formed by said machine to said fly, a spring for actuating said fly during a discharge operation, and a cam for returning said fly to its initial position.

15. The combination with a slicing machine, of a slice stacker therefor, a cam for operating said stacker when said machine is driven in one direction, a member for coöperating with said cam to receive movement therefrom, and a support for said member arranged to yield to the movement of said cam when said machine is operated in the opposite direction to permit said reverse operation of the machine.

16. The combination with a slicing machine, of a conveyer for receiving slices therefrom and arranged to transfer said slices into a plane parallel with the plane of the slicing knife but removed therefrom, and a fly having an axis of rotation parallel with the plane of said knife for discharging the slices from said conveyer.

17. The combination with a slicing machine, of a conveyer having prongs thereon for receiving slices as they are formed by said machine and for transferring said slices away from the slicing knife, a fly having fingers located adjacent the path of movement of said prongs and arranged to discharge the slices therefrom, a spring for moving said fly to transfer the slices from said conveyer into a horizontal position, a cam for moving said fly in opposition to the tension of said spring and for holding said fly in position adjacent the path of movement of said prongs during a part of the cycle of operation of said machine and for releasing said fly to permit discharge of slices from said conveyer, transmission mechanism for connecting said cam with the operating parts of said slicing machine, and a buffer for controlling the movement of said fly during its discharging operation.

18. The combination with a slicing machine, of a slice stacker comprising a slice discharging device, a spring for actuating said discharging device, and a buffer for said discharging device arranged to offer a gradually varying resistance to the action of said spring.

19. The combination with a slicing machine, of a slice stacker therefor comprising a discharging device, a spring for operating said discharging device, and a buffer comprising a cam, and a spring pressed member coöperating therewith for controlling the movement of said discharging device under the tension of said spring.

20. The combination with a slicing machine, of a device for discharging slices therefrom, and a buffer for controlling the operation of said slice discharging device.

21. The combination with a slicing machine, of a device for depositing slices formed thereby, a spring for actuating said device during a depositing operation, and a buffer for controlling said operation.

22. The combination with a slicing machine, of a conveyer having prongs thereon for receiving slices as they are formed by said machine and for transferring said slices away from the slicing knife, a fly having fingers located adjacent the path of movement of said prongs and arranged to discharge the slices therefrom, a spring for moving said fly to transfer the slices from said conveyer into a horizontal position, a cam for moving said fly in opposition to the tension of said spring and for holding said fly in position adjacent the path of movement of said prongs during a part of the cycle of operation of said machine and for releasing said fly to permit discharge of slices from said conveyer, transmission mechanism for connecting said cam with the operating parts of said slicing machine, a buffer for controlling the movement of said fly during its discharging operation, and a safety device for permitting reverse movement of said operating parts of said slicing machine independently of said slice handling mechanism.

In testimony whereof I have signed my name to this specification on this 2nd day of July, A. D. 1917.

CORNELIS F. M. van BERKEL.